United States Patent [19]

Amos et al.

[11] Patent Number: 5,207,005
[45] Date of Patent: May 4, 1993

[54] FLOATING HEAD PROBE

[75] Inventors: Jay M. Amos, Hobe Sound; David A. Raulerson, Palm Beach Gardens, both of Fla.

[73] Assignee: United Technologies Corporation, Hartford, Conn.

[21] Appl. No.: 915,565

[22] Filed: Jul. 20, 1992

[51] Int. Cl.[5] ............................................. G01B 3/00
[52] U.S. Cl. ............................... 33/501.04; 33/517; 33/551; 33/558
[58] Field of Search .............. 33/517, 542, 544, 544.3, 33/546, 551, 553, 554, 555, 556, 558, 559, 561, 1 M, 23.11, 501.04

[56] References Cited

U.S. PATENT DOCUMENTS

| | | | |
|---|---|---|---|
| 2,990,617 | 7/1961 | Mustonen | 33/23.11 |
| 3,068,581 | 12/1962 | Skalwold et al. | 33/551 |
| 3,166,852 | 1/1965 | Whitney | 33/517 |
| 3,816,932 | 6/1974 | Legille | 33/558 |
| 4,571,848 | 2/1986 | Krütz et al. | 33/553 |
| 4,976,043 | 12/1990 | Bieg | 33/545 X |

FOREIGN PATENT DOCUMENTS 9101849  2/1991  World Int. Prop. O. ............ 33/1 M

OTHER PUBLICATIONS

Western Electric Tech. Oct. 1973 Probe Assembly.

Primary Examiner—William A. Cuchlinski, Jr.
Assistant Examiner—Alvin Wirthlin
Attorney, Agent, or Firm—Norman Friedland

[57] ABSTRACT

A probe for inspecting contoured surfaces by transmitting and receiving eddy currents includes a shaft disposed in spatial relationship with the contoured surface and a pivotal probe manipulator rotatably mounted on the end of the shaft and having a critical dimension including the location of the pivot point and the width of the probe manipulator and spring means urging the probe manipulator against the contoured surface so that the probe travels along the surface and rotates substantially ±90 degrees relative to the shaft.

7 Claims, 2 Drawing Sheets

FLOATING HEAD PROBE

This invention was made under a U. S. Government contract and the Government has rights herein.

DESCRIPTION

1. Technical Field

This invention relates to contact probes for detecting defects in contoured surfaces and particularly to a probe that rotates substantially 180 degrees.

2. Background Art

As is well known in the art of eddy current inspection of curved surfaces such as races in bearings, it is necessary to utilize multiple probes or manipulate the probe by a complex mechanical system. The probe includes a sensor that is essentially a combined transmitter and receiver that generates eddy currents to establish a base line signal. Perturbations or disturbances from this base line are sensed by the sensor and are transmitted in a well known manner to an oscilloscope or a lie device for viewing by the operator. Obviously, the amount or level of deviation from the base line signal will be determinative of whether or not the part being inspected passes the inspection criteria.

There are a number of measuring devices that are capable of measuring relative distances as for example the system exemplified in U.S. Pat. No. 3,714,715 entitled "Grinding Control System" granted to L. Coes, Jr. on Feb. 6, 1973. This patent shows a spring loaded linkage system that is fixed in a given position with a pivotal stylus contacting a moving contoured surface to define a spatial relationship.

U.S Pat. No. 4,982,504 entitled "Method of Determining Positional Errors and for Compensating for such Errors, and Apparatus for Carrying Out the Method granted to B Soderberg et al on Jan. 8, 1991 and U.S. Pat. No. 3,816,932 entitled "Trailing Gauge" granted to E. Legille on Jun. 18, 1974 are other examples of apparatus that measure the spatial relationship of contoured surfaces.

However, none of the above referred to references are capable of following the contour of a fixed in space surface that approaches plus or minus 90 degrees as is the contour of the race of a bearing.

DISCLOSURE OF INVENTION

An object of this invention is to provide an improved probe for inspecting curved surfaces.

A feature of this invention is to provide a probe as described that includes a rotatable head moveable to plus or minus 90 degrees housing a sensor that is attached to a linearly moveable spring biased shaft supported in spatial relationship relative to the article being inspected and characterized as being relatively simple and inexpensive to fabricate and is easy to operate particularly in comparison to the heretofore known probes.

A feature of this invention is to provide a rotatable probe as described wherein dimensions of the tip portion of the probe is critical such that the ratio of the distance between the surface contacting end of the probe and the probe's rotating axis to the width of the probe's tip portion is substantially equal to a value where the tip doesn't inadvertently disengage from the surface being inspected during transition of the probe. A suitable ratio has been determined to be approximately 0.8 or less.

The foregoing and other features of the present invention will become more apparent from the following description and accompanying drawings.

BEST MODE FOR CARRYING OUT THE INVENTION

Figure 1:
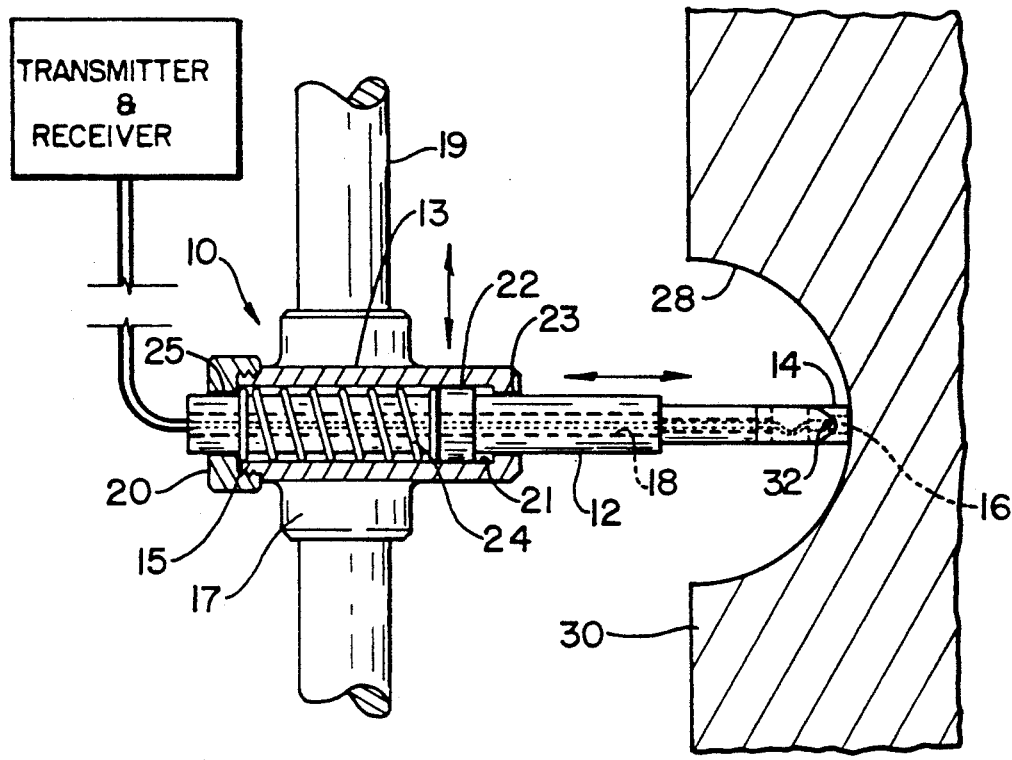
FIG. 1 is a partial plan view partly in section illustrating the invention in one position in operation.
Figure 2:
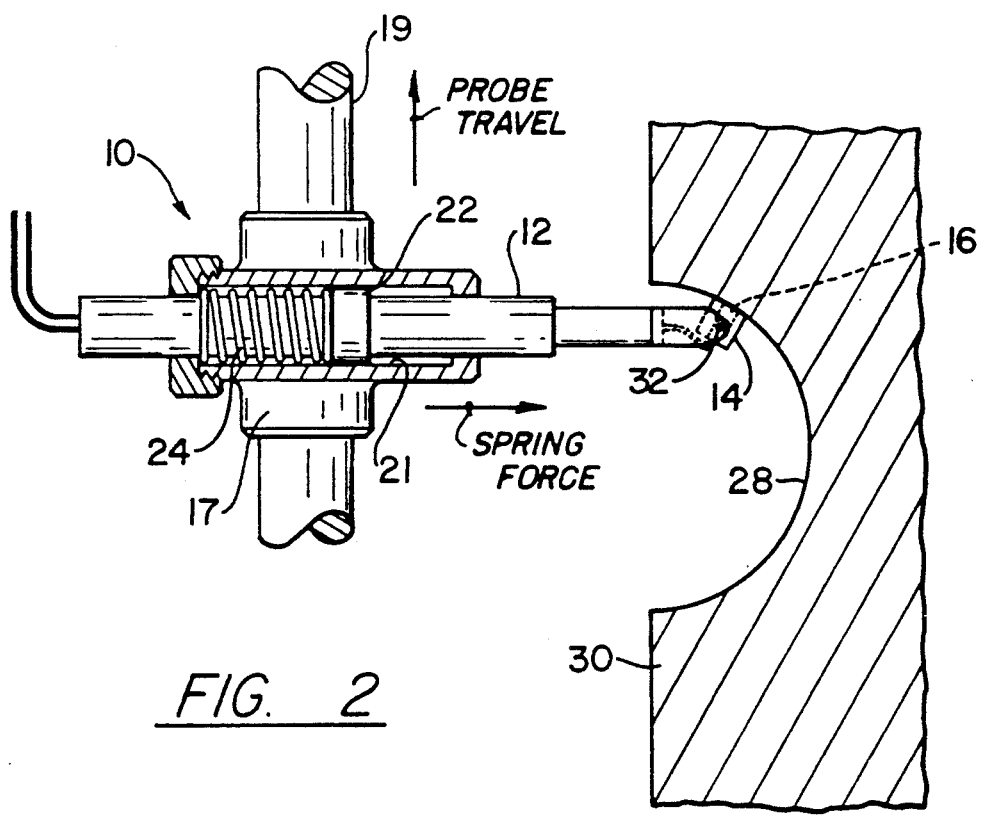
FIG. 2 is a view identical to FIG. 1 when the probe is in another position in operation.

Reference is made to FIGS. 1 and 2 which are views in elevation which best show the probe generally illustrated by reference numeral 10. Probe 10 is comprised of fixed shaft 12 which 14 carries pivotal tip portion or probe manipulator housing sensor 16. Longitudinal bore 18 is formed in the center of shaft 12 and serves to carry the wires leading from a suitable and commercially available eddy current transmitter and receiver (not shown) for inspecting the curved surface of the article being inspected, which in this instance is the race of a bearing. Shaft 12 may be formed to include a smaller diameter section 18, for practical considerations.

In operation the shaft is slidably supported to a vertical rail 19 by slider 17 that includes a bore in which rail 19 is in slidable relation that fixes the shaft in spatial relationship to the curved surface of the article being inspected. The end of shaft 12 is supported to carrying element 13 that includes a central bore 21 and bearing surface 23 Cap 20 is threaded to the upper end of element 13 and carries a second bearing surface 25 for supporting shaft 12, which is mounted to slide relative to bearing surfaces 23 and 25. The inner surface of cap 20 defines a shoulder 15. A wider diameter portion 22 is formed on shaft 12 spaced slightly away from cap 25 to form a second shoulder 21 to retain one end of coil spring 24. The other end of coil spring 24 bears against shoulder 15 which serves to bias shaft 12 and hence pivotal tip portion 14 toward the surface 28 of race 30.

As is apparent from the foregoing, the spring biased tip portion 14 in this position imparts a slight force to hold the sensor 16 in the tip portion in contact with the surface being inspected. As shaft 12 is moved relative to the rail 19 to the next station on the curvature being inspected, tip portion 14 will begin to rotate about its axis 32 and will continue to urge the sensor to stay in contact with the contoured surface 28 of race 30.

A principal advantage of this technique is that the required contour following motion is effected only by a linear translation in a direction perpendicular to the pivot axis 32 and the longitudinal axis of shaft 12.

The tip portion carries a central recess to support sensor 16 (shown in blank). It is apparent from the foregoing sensor 16 serves to transmit and receive an electrical signal to the station on contoured surface 28 of the race 30. This sets up the eddy currents which is compared with a predetermined base line signal. Obviously, any deviation or perturbation from the base line value observed by the operator will be determinative of whether or not the part passes inspection.

Figure 4:
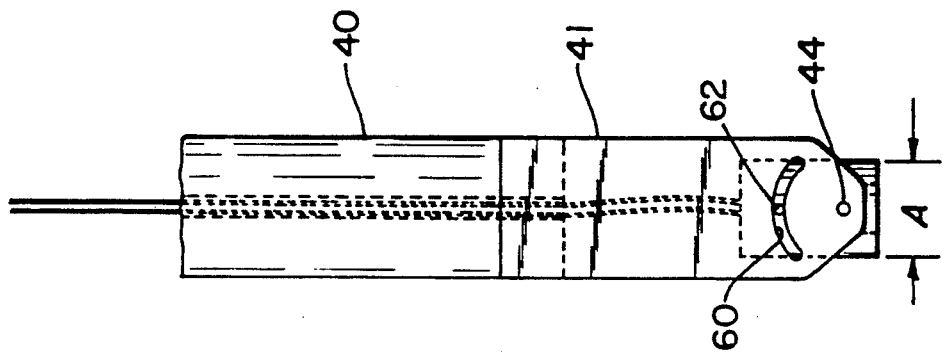
FIG. 4 is a partial view in section.
Figure 3:
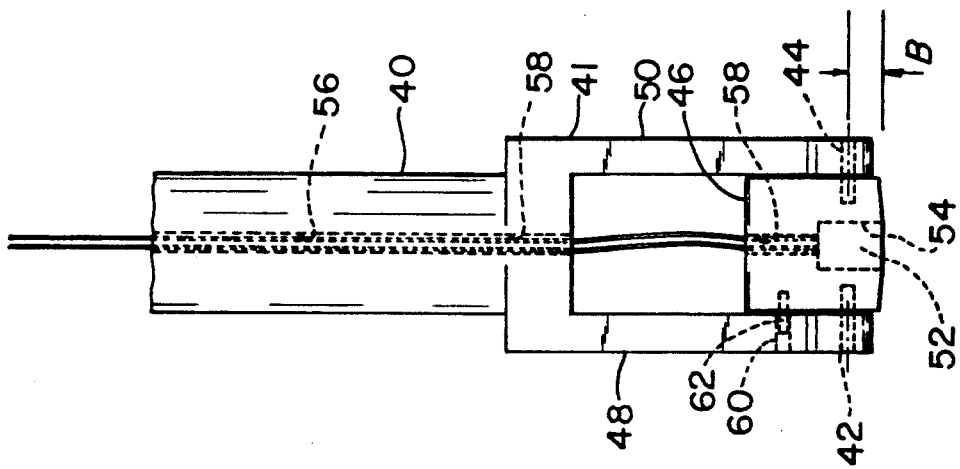
FIG. 3, is a partial enlarged view in section showing the details of another embodiment of this invention.

As seen in FIGS. 3 and 4, which illustrate another preferred embodiment of the invention and which is essentially similar to the construction depicted in FIGS.

1 and 2. In this configuration the shaft 40 carries a bifurcated section 41 at one end that supports by trunnions 42 and 44 the rotating tip portion 46 between the parallel legs 48 and 50, respectively. The carrier and spring assembly shown in FIGS. 1 and 2 are intended to be used in the embodiment of FIGS. 3 and 4 and for the sake of convenience and simplicity that portion will be omitted from this description. The sensor 52 (shown in blank) is fitted into recess 54 formed on the bottom end of tip portion 46 and is suitably held in this position. The wires interconnecting sensor 52 and the transmitter and receiver of the probe pass through central bore 56 and 58 formed in shaft 40 and tip portion 46, respectively.

Rotational displacement of tip portion 46 may be limited by including cam slot 60 formed in leg 42 and stop pin 62 retained in a drilled hole formed in the side wall of tip portion 46. In this embodiment and in accordance with this invention the tip portion of probe 46 follows the contoured surface 28 of race 30 (see FIGS. 1 and 2) and is biased to remain in contact the entire distance of the contoured surface which in this instance is substantially equal to ±90 degrees.

To assure that tip portion doesn't flip over and become disengaged from the contoured surface being inspected, certain dimensions of the tip portion are deemed to be critical. In particular, tip portion 46 must be able to travel in either direction in the plane of the contoured surface shown in the FIGS. 1 and 2 and remain in contact with the contoured surface for the extent of the travel. This requires that tip portion 46 must rotate about its rotating axis substantially ±90 degrees. One of the dimensions deemed critical is the width of the tip portion depicted by arrow A and the other dimension deemed to be critical is the distance between the contacting face of the sensor, in situ, and the rotating axis of the tip portion depicted by arrow B. Of course, these dimensions will vary depending on the dimensions of the supporting elements of the probe, however it was found that a ratio of the dimension between the face of the sensor and the rotating axis to the width of the tip portion should be approximately 0.8 or less. In this embodiment a satisfactory dimension of the width of the tip portion was substantially equal to 0.1 inch and the dimension of the distance between the face of the sensor to its rotating axis was substantially equal to 0.080 inch.

While the invention is particularly efficacious for use in eddy current inspection applications, as one skilled in this art will appreciate, tis invention has applications for other techniques including, without limitation, other type sensors as ultrasonics and the like. It should be understood that almost any type of sensor application where contact inspection of a contoured surface may utilize the teachings of this invention.

Although this invention has been shown and described with respect to detailed embodiments thereof, it will be appreciated and understood by those skilled in the art that various changes in form and detail thereof may be made without departing from the spirit and scope of the claimed invention.

What is claimed:

1. A probe for inspecting a contoured surface having a generally cylindrical hollow shaft having a distal end, a manipulator including a pivot for being pivotally mounted on said shaft at said distal end, and a sensor supported in a recess centrally formed in said manipulator and having a face adapted to engage a contoured surface intended to be inspected, a fixed support member for said hollow shaft for locating said probe in spatial relationship relative to said contoured surface, including means for permitting movement of said probe at a constant distance from a given point of contact with said contoured surface, spring means biasing said manipulator urging the outer face of said sensor in contact with said contoured surface, the distance from the outer end of said manipulator to said pivot being selected to permit said manipulator to rotate substantially equal to ±90 degrees while said sensor maintains its contact throughout its travel, and means for connecting said probe through said hollow shaft and a central hole in said manipulator to a transmitter and receiver to transmit and receive signals indicative of the acceptability of the part being inspected.

2. A probe for inspecting a contoured surface as claimed in claim 1 wherein the ratio of the dimension extending from said face of said sensor of the probe to said pivot to the width of said manipulator is approximately 0.8 or less.

3. A probe for inspecting a contoured surface as claimed in claim 2 wherein said shaft includes a bifurcated end having a pair of opposing parallel legs, said pivot including a pair of diametrically opposed trunions mounted in said legs and pivotally supporting said manipulator.

4. A probe for inspecting a contoured surface as claimed in claim 3 including means for limiting the rotational travel of said manipulator.

5. A probe for inspecting a contoured surface as claimed in claim 4 wherein last mentioned means includes a pin extending from a side of said manipulator into a cam slot formed in one of said pair of legs.

6. A probe for inspecting a contoured surface as claimed in claim 5 wherein said spring means is a helical coiled spring.

7. A probe for inspecting a contoured surface as claimed in claim 1 wherein said transmitter and receiver transmit and receive eddy currents.

* * * * *